United States Patent
Chen et al.

(10) Patent No.: US 10,998,926 B2
(45) Date of Patent: May 4, 2021

(54) METHOD FOR COMPENSATING GAIN FLATNESS OF TRANSCEIVER

(71) Applicant: SUNWAVE COMMUNICATIONS CO., LTD., Hangzhou (CN)

(72) Inventors: Qingsong Chen, Hangzhou (CN); Xin Wang, Hangzhou (CN); Wenquan Wu, Hangzhou (CN); Ailin Ren, Hangzhou (CN)

(73) Assignee: SUNWAVE COMMUNICATIONS CO., LTD., Hangzhou (CN)

( * ) Notice: Subject to any disclaimer, the term of this patent is extended or adjusted under 35 U.S.C. 154(b) by 0 days.

(21) Appl. No.: 16/891,049

(22) Filed: Jun. 2, 2020

(65) Prior Publication Data
US 2020/0395968 A1 Dec. 17, 2020

(30) Foreign Application Priority Data
Jun. 11, 2019 (CN) .......................... 201910501515.2

(51) Int. Cl.
*H04B 1/12* (2006.01)
*H04B 1/40* (2015.01)
(Continued)

(52) U.S. Cl.
CPC .......... *H04B 1/123* (2013.01); *H04B 1/0017* (2013.01); *H04B 1/40* (2013.01); *H04L 25/03828* (2013.01); *H04L 27/2334* (2013.01)

(58) Field of Classification Search
CPC .. H04B 1/0007; H04B 1/0014; H04B 1/0017; H04B 1/04; H04B 1/123; H04B 1/16; H04B 1/38; H04B 1/40; H04B 2001/1054; H04L 25/03; H04L 25/03006; H04L 25/03038; H04L 25/03057; H04L 25/03146; H04L 25/03178; H04L 25/03828; H04L 27/20; H04L 27/22; H04L 27/2334; H04L 27/2627; H04L 27/2634; H04L 27/26412; H04L 27/2647; H04L 27/265; H04L 27/26524; H04L 27/26536; H04L 2025/03401; H04L 2025/03821
USPC ....... 375/232, 233, 260, 262, 265, 284, 285, 375/295, 308, 329, 341, 346, 348, 350; 370/208, 210; 455/500, 501, 63.1, 67.11, 455/67.13; 703/322, 323, 403, 404
See application file for complete search history.

(56) References Cited

U.S. PATENT DOCUMENTS

| | | | |
|---|---|---|---|
| 2005/0189990 A1* | 9/2005 | Mizuta ................. | H03F 1/3258 330/52 |
| 2010/0054759 A1* | 3/2010 | Oda .................... | H04B 10/6971 398/202 |

(Continued)

*Primary Examiner* — Young T. Tse

(57) ABSTRACT

The present disclosure provides a method for compensating gain flatness of a transceiver including: a method for compensating gain flatness of a receiver, which compensates gain flatness of a receiving channel by using a complex-coefficient FIR filter in digital domain; and a method for compensating gain flatness of a transmitter, which compensates gain flatness of a transmitting channel by using a complex-coefficient FIR filter in digital domain. The method according to the present disclosure can balance compensation accuracy and calculation amount flexibly, and can focus on compensating the gain flatness at an edge of a frequency band, obtaining good performance with less calculation amount.

14 Claims, 2 Drawing Sheets

(51) Int. Cl.
   *H04L 25/03*      (2006.01)
   *H04B 1/00*       (2006.01)
   *H04L 27/233*     (2006.01)

(56) References Cited

U.S. PATENT DOCUMENTS

2010/0277236 A1* 11/2010 Horiguchi ............ H04B 1/0475
                                                    330/149
2011/0038400 A1*  2/2011 Ishikawa ............. H04L 27/2337
                                                    375/219
2018/0302211 A1* 10/2018 Onuma ................... H04B 1/16
2019/0089434 A1*  3/2019 Rainish ................. H04B 7/086
2020/0092053 A1*  3/2020 Bai ..................... H04B 17/101

* cited by examiner

METHOD FOR COMPENSATING GAIN FLATNESS OF TRANSCEIVER

CROSS REFERENCE TO RELATED APPLICATIONS

This application claims priority under 35 U.S.C. § 119 to Chinese Patent Application No. 201910501515.2, filed on Jun. 11, 2019, the entire content of which is incorporated herein in its entirety.

TECHNICAL FIELD

The present disclosure relates to a technical field of wireless communication, and more particularly, relates to a method for compensating gain flatness of a transceiver.

BACKGROUND

With the application of 4G/5G, a radio transceiver has a wide working frequency band, which can reach several hundred megahertz. In such a wide frequency range, it is difficult to guarantee gain flatness of a radio frequency (RF) device.

A method for compensating gain flatness of a transceiver has been presented in the related art, which can compensate gain flatness of an analog device through digital signal processing. The method is described as follows: setting $f_s/N$ as an frequency interval, and testing gains of a receiving channel and a transmitting channel, where $f_s$ is a digital signal sampling rate, and N takes an integer power of 2; calculating a gain flatness of a link based on a power of a center frequency point; adding linear phase information to data of the calculated gain flatness, and then performing IFFT transformation; and using a result of the IFFT transformation as a coefficient of a complex FIR filter to compensate the gain flatness.

SUMMARY

When the prior method in the art is applied to a large-bandwidth transceiver, there are some limitations and deficiencies as follows.

(1) The value of N should be restricted to an integer power of 2. Generally, the larger the N, the more accurate the compensation is, but the more computing resources the FIR filter consumes. When a bandwidth of transceiver is large, it is difficult to achieve a balance between compensation accuracy and calculation amount in hardware implementation. Taking fs=245.76 MSps as an example, assuming that N is taken as 32, the frequency interval is 7.68 MHz, and the compensation accuracy is low. Assuming that N is taken as 64, the frequency interval is 3.84 MHz, the compensation accuracy is high, but the calculation amount of the complex FIR filter is 8 times of that when N is taken as 32.

(2) For the large-bandwidth transceiver, since the characteristics of the RF filter, the gain flatness is usually poor at an edge of a frequency band, and the gain flatness is better at a middle of the frequency band, a weight should be tilted toward the edge of the frequency band when compensating. However, the above method treats all frequency points equally and cannot highlight the key points. Thus, more points (larger N) are needed to obtain accurate compensation results.

According to embodiments of the present disclosure, a method for compensating gain flatness of a transceiver is provided, to at least partially solve the technical problem that the method for compensating the gain flatness of the transceiver provided in the related art is difficult to apply to a large bandwidth transceiver.

According to an aspect of the present disclosure, a method for compensating gain flatness of a receiver is provided, which compensates gain flatness of a receiving channel by using a complex-coefficient FIR filter in digital domain. The method includes: converting a signal received by an ADC into an IQ signal with zero-intermediate frequency; setting, by a signal generator, $f_c-f_s/2$ as a starting frequency point, transmitting single-tone signals at N frequency points with an frequency interval of $f_s/N$, and calculating a power $P_n$ of each frequency point in the digital domain, where $f_c$ represents a center frequency of the receiving channel, $f_s$ represents a sampling rate of a digital signal, and N takes a value of an integer power of 2; calculating the gain flatness in a whole $f_s$ bandwidth based on a power of the center frequency $f_c$ of the receiving channel to obtain a sequence $P_n'$; adding linear phase information to $P_n'$ to construct a complex sequence $X_n$ of N points; performing an IFFT transformation of N points on $X_n$ to obtain a frequency response $Y_n$; approximating the frequency response $Y_n$ using a complex sequence $Z_q$ of Q points, Q being chosen from a suitable integer; and constructing a Q-order complex FIR filter with $Z_q$ as a coefficient of the filter in the digital domain, filtering the IQ signal, and obtaining a filtering result as data after compensating the gain flatness.

According to an embodiment of the present disclosure, a power of an input signal is calculated by the following formula by using an amplitude of the IQ signal in the digital domain:

$$P=10*\log_{10}((\Sigma_{m=0}^{M-1}I_m^2+Q_m^2)/M),$$

where M represents the number of points for calculating the power.

According to an embodiment of the present disclosure, the sequence $P_n'$ is calculated by the following formula:

$$P_n'=10^{(P_n-P_{N/2})/20}, n=0,1,2\ldots N-1,$$

where $P_{N/2}$ is a power point corresponding to the center frequency $f_c$ of the receiving channel.

According to an embodiment of the present disclosure, the adding the linear phase information to $P_n'$ to construct the complex sequence $X_n$ of N points is calculated by the following formula:

$$X_n=P_n'*e^{j\pi(N/2-n)*(N-1)/N}, n=0,1,2\ldots N-1.$$

According to an embodiment of the present disclosure, the performing the IFFT transformation of N points on $X_n$ to obtain the frequency response $Y_n$ includes: performing a shift processing on $X_n$ to obtain $X_n'$, and performing the IFFT transformation on $X_n'$ to obtain the frequency response $Y_n$. The shift processing is performed by the following formula:

$$X_n' = \begin{cases} X_{n+N/2} & \text{if } n < N/2 \\ X_{n-N/2} & \text{if } n \geq N/2 \end{cases}.$$

According to an embodiment of the present disclosure, the method further includes: giving single-tone signals at a plurality of frequency points $(f_1, f_2, \ldots, f_n)$ different amplitudes $(G_1, G_2, \ldots, G_n)$, the single-tone signals at an edge of a frequency band being given an amplitude of a relative large G value, and the single-tone signals at other part of the frequency band being given an amplitude of a relative small G value; using the single-tone signals at the plurality of the frequency points as an excitation source of the filter; calculating half of the $Y_n$ to obtain half of the $Z_q$; and obtaining the $Z_q$ for best approximating the $Y_n$ when a mean square error is the smallest or an self-adaptation process converges.

According to an embodiment of the disclosure, one complex-coefficient FIR filter is constructed with four real coefficient FIR filters.

According to another aspect of the disclosure, a method for compensating gain flatness of a transmitter is provided, which compensates gain flatness of a transmitting channel by using a complex-coefficient FIR filter in digital domain. The method includes: generating, by an NCO, single-tone signals at N frequency points with an frequency interval of $f_s/N$ in a frequency range from $-f_s/2$ to $f_s/2$, and measuring, by a spectrum analyzer the power $P_n$ at each frequency point, where $f_s$ represents a sampling rate of a digital signal, and N takes a value of an integer power of 2; calculating the gain flatness of the transmitting channel based on a power of a center frequency of the transmitting channel to obtain a sequence $P_n'$; adding linear phase information to $P_n'$ to construct a complex sequence $X_n$ of N points; performing an IFFT transformation of N points on $X_n$ to obtain a frequency response $Y_n$; approximating the frequency response $Y_n$ using a complex sequence $Z_q$ of Q points, where Q is chosen from a suitable integer; and constructing a Q-order complex FIR filter with $Z_q$ as a coefficient of the filter in the digital domain before the digital signal is transmitted to a DAC, converting a signal received by the ADC into an IQ signal, filtering the IQ signal, and obtaining a filtering result as transmitting data after compensating the gain flatness.

According to an embodiment of the present disclosure, a power of an input signal is calculated by the following formula by using an amplitude of the IQ signal in the digital domain:

$$P=10*\log_{10}((\Sigma_{m=0}^{M-1}I_m^2+Q_m^2)/M),$$

where M represents the number of calculated power points.

According to an embodiment of the present disclosure, the sequence $P_n'$ is calculated by the following formula:

$$P_n'=10^{(P_n-P_{N/2})/20}, n=0,1,2\ldots N-1.$$

$P_{N/2}$ is a power point corresponding to a center frequency $f_c$ of the transmitting channel.

According to an embodiment of the present disclosure, the adding the linear phase information to $P_n'$ to construct the complex sequence $X_n$ of N points is calculated by the following formula:

$$X_n=P_n'*e^{j\pi(N/2-n)*(N-1)/N}, n=0,1,2\ldots N-1.$$

According to an embodiment of the present disclosure, the performing the IFFT transformation of N points on $X_n$ to obtain the frequency response $Y_n$ includes: performing a shift processing on $X_n$ to obtain $X_n'$, and performing the IFFT transformation on $X_n'$ to obtain the frequency response $Y_n$. The shift processing is performed by the following formula:

$$X_n' = \begin{cases} X_{n+N/2} & \text{if } n < N/2 \\ X_{n-N/2} & \text{if } n \geq N/2 \end{cases}.$$

According to an embodiment of the present disclosure, the method further includes: giving single-tone signals at a plurality of frequency points $(f_1, f_2, \ldots, f_n)$ different amplitudes $(G_1, G_2, \ldots, G_n)$, the single-tone signals at the an edge of a frequency band being given an amplitude of a relative large G value, and the single-tone signals at other part of the frequency band being given an amplitude of a relative small G value; using the single-tone signals at the plurality of the frequency points as an excitation source of the filter; calculating half of the $Y_n$ to obtain half of the $Z_q$; and obtaining the $Z_q$ for best approximating the $Y_n$ when a mean square error is the smallest or an self-adaptation process converges.

According to an embodiment of the present disclosure, one complex-coefficient FIR filter is constructed with four real coefficient FIR filters.

According to at least part of the embodiments of the present disclosure, it is possible to balance the compensation accuracy and the calculation amount flexibly, and can focus on compensating the gain flatness at the edge of the frequency band, obtaining good performance with less calculation amount.

DETAILED DESCRIPTION OF THE EMBODIMENTS

The preferred embodiments of the present disclosure will be described in detail below with reference to the drawings.

Figure 1:
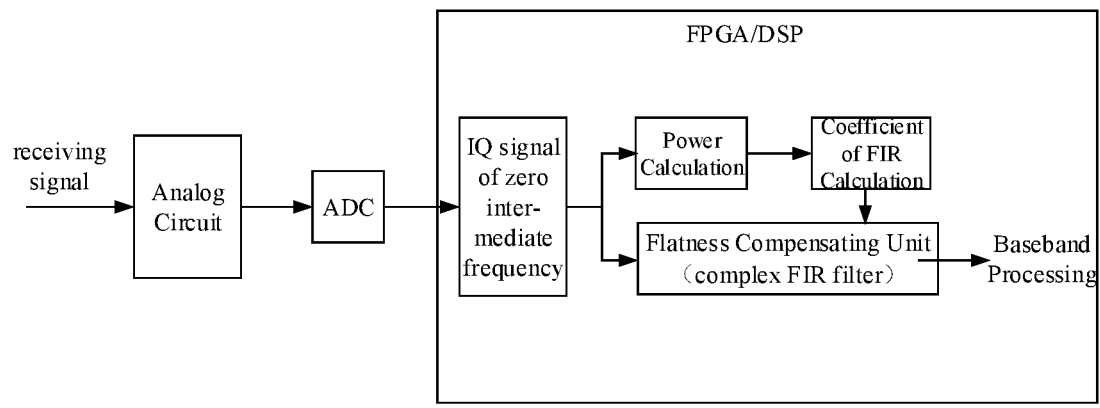
FIG. 1 is a schematic structural diagram illustrating a device for implementing a method for compensating gain flatness of a receiver according to an embodiment of the present disclosure.

The receiver includes an analog circuit unit, an analog-to-digital converter (ADC) and a digital signal processor (DSP) or Field-programmable gate array (FPGA). FIG. 1 is a schematic structural diagram illustrating a device for implementing a method for compensating gain flatness of a receiver according to an embodiment of the present disclosure. As shown in FIG. 1, the analog circuit unit of the receiver generally includes a duplexer, a one-stage or multi-stage band-pass filter, a low noise amplifier (LNA), a mixer or demodulator, a gain amplifier, an attenuator and other circuits. Since the analog circuit unit is not an important part of the present disclosure, it is illustrated by one module block in FIG. 1.

The un-flatness gain of the receiver is mainly caused by the analog circuit unit. According to the present disclosure, a complex finite impulse response (FIR) filter is constructed in digital domain so as to compensate the gain flatness.

In the digital domain, a signal sampled by the ADC is firstly converted into an IQ signal with zero-intermediate frequency (zero-IF) through spectrum shifting and low-pass filtering. If the analog circuit unit adopts a zero-IF scheme and the ADC adopts dual-channel IQ sampling, this process can be omitted.

A power calculation module calculates a power of an input signal. The power is calculated in the digital domain using the following formula:

$$P=10*\log_{10}((\Sigma_{m=0}^{M-1}I_m^2+Q_m^2)/M),$$

where M represents the number of points for calculating the power. In order to make the calculation result as accurate as possible, M=32768 in this embodiment.

A signal generator sets $f_c-f_s/2$ as a starting frequency point, and $f_s/N$ as a stepping. N represents the number of the frequency points and there are single-tone signals at N frequency points. The power $P_n$ of each frequency point in the digital domain is calculated using the above formula. $f_c$ represents a center frequency of a receiving channel, and $f_s$ represents a sampling rate of a digital signal. Since an IFFT transformation is to be performed on $P_n$, for convenience of calculation, a value of N is limited to an integer power of 2. The larger the value of N, the more accurate the flatness compensation result is.

A gain flatness $P_n'$ of the receiving channel is calculated based on the center frequency $f_c$ of the channel. The power point corresponding to $f_c$ is $P_{N/2}$, then:

$$P_n'=10^{(P_n-P_{N/2})/20}, n=0,1,2 \ldots N-1.$$

Since a logarithm operation is used to calculate the power P, the unit of P is dB. The power operation in the above formula converts the value in dB to an absolute value.

In order for signals of different frequencies to pass through the communication system without distortion, the communication system requires a characteristic of linear phase. The method for compensating gain flatness according to the present disclosure is implemented by a complex-coefficient FIR filter, so the filter also requires the characteristic of linear phase. In the above description, only the amplitude characteristics at different frequency points are obtained, and thus it is necessary to add a phase characteristic artificially to construct a linear phase system.

The complex sequence after adding the phase characteristic is as follows.

$$X_n=P_n'*e^{j\pi(N/2-n)*(N-1)/N}, n=0,1,2 \ldots N-1$$

According to the above, a frequency sequence for calculating power is from $-f_s/2$ to $f_s/2$. However, according to the principle of IFFT transformation, the corresponding frequency sequence is from 0 to $f_s$. Thus, before performing IFFT transformation, the sequence $X_n$ needs to be transformed to a sequence $X_n'$ which corresponds to frequencies from 0 to $f_s$. The method for transformation is as follows.

$$X_n' = \begin{cases} X_{n+N/2} & \text{if } n < N/2 \\ X_{n-N/2} & \text{if } n \geq N/2 \end{cases}$$

Finally, a IFFT transformation of N points is performed on $X_n'$, so as to obtain a complex sequence $Y_n$ as the coefficient of the FIR filter.

$$Y_n=IFFT(X_n')$$

The IFFT transformation is a general algorithm in digital signal processing, the detail of which is not described here.

Figure 2:
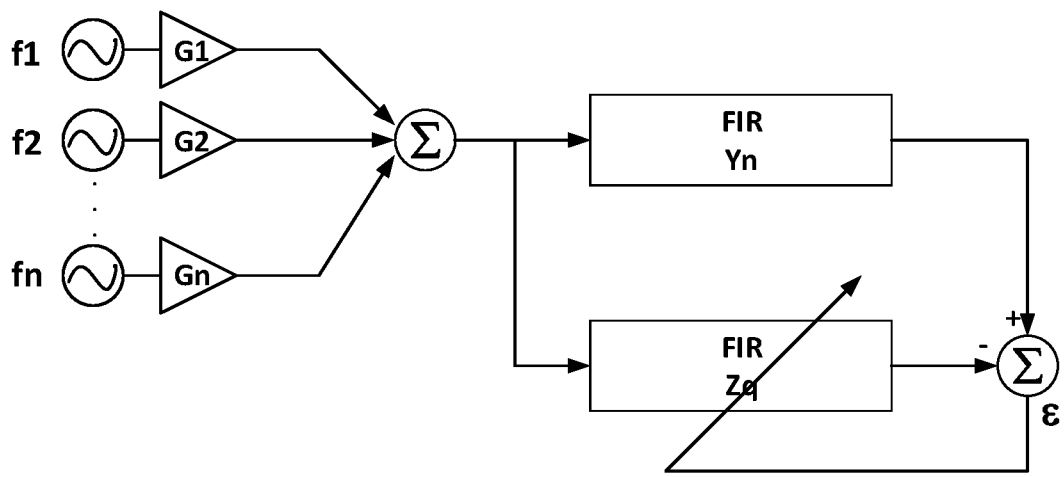
FIG. 2 is schematic diagram illustrating a method for approximating a frequency response $Y_n$ using a complex sequence $Z_q$ of Q points according to an alternative embodiment of the present disclosure.

FIG. 2 is schematic diagram illustrating a method for approximating a frequency response $Y_n$ using a complex sequence $Z_q$ of Q points according to an alternative embodiment of the present disclosure. As shown in FIG. 2, the complex sequence $Z_q$ of Q points is used to approximate the frequency response $Y_n$. Single-tone signals at a plurality of frequency points ($f_1, f_2, \ldots f_n$) are given different amplitudes ($G_1, G_2, \ldots G_n$). The single-tone signals at an edge of the frequency band are given an amplitude of a relative large G value, and the single-tone signals at other part of the frequency band are given an amplitude of a relative small G value, because the gain flatness is usually poor at the edge of the frequency band and the gain flatness is better at a middle of the frequency band. Thus, when compensating the flatness, the weight is tilted toward the edge of the frequency band.

The above single-tone signals at the plurality of the frequency points are used as an excitation source of the filter, and during the calculation, it is only necessary to calculate half of the $Y_n$ to obtain half of the $Z_q$. Since the filter has the characteristic of linear phase, the coefficients of the filter are symmetrical, that is, only half of the coefficients need to be calculated.

When the mean square error is the smallest, i.e., the self-adaptation process converges, a $Z_q$ for best approximating the $Y_n$ is obtained.

In an alternative embodiment of the present disclosure, a complex-coefficient FIR filter may be used to compensate the gain flatness. However, in conventional digital signal processing, a real coefficient FIR filter is generally used. Thus, a method for constructing the complex FIR filter with the real coefficient FIR filter is also provided.

Figure 3:
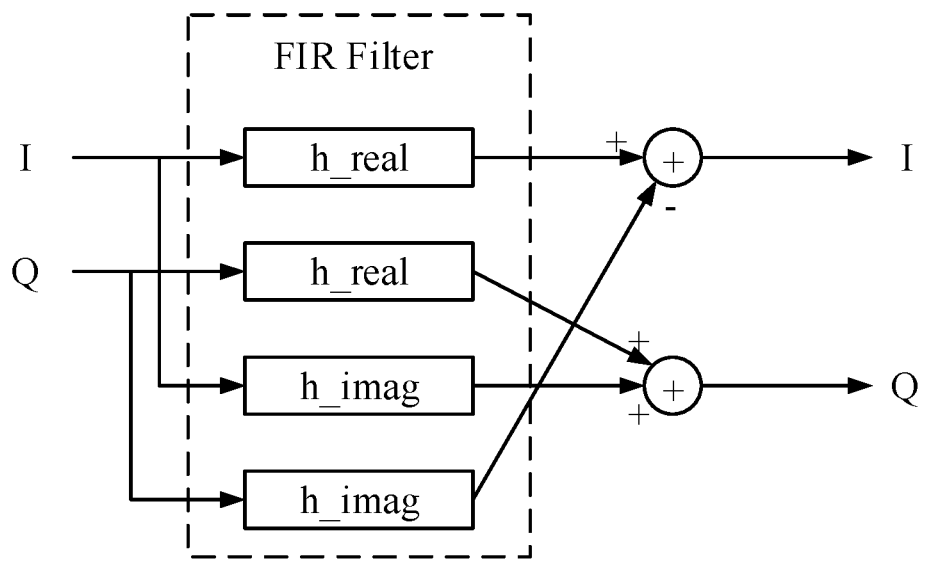
FIG. 3 is a schematic diagram of constructing a complex-coefficient filter with four real coefficient FIR filters according to an alternative embodiment of the present disclosure.

FIG. 3 is a schematic diagram of constructing the complex-coefficient filter with four coefficient FIR filters according to an alternative embodiment of the present disclosure. As shown in FIG. 3, four coefficient FIR filters construct one complex-coefficient FIR filter. The h_real represents the real part of the complex-coefficient and the h_imag represents the imaginary part of the complex-coefficient.

Figure 4:
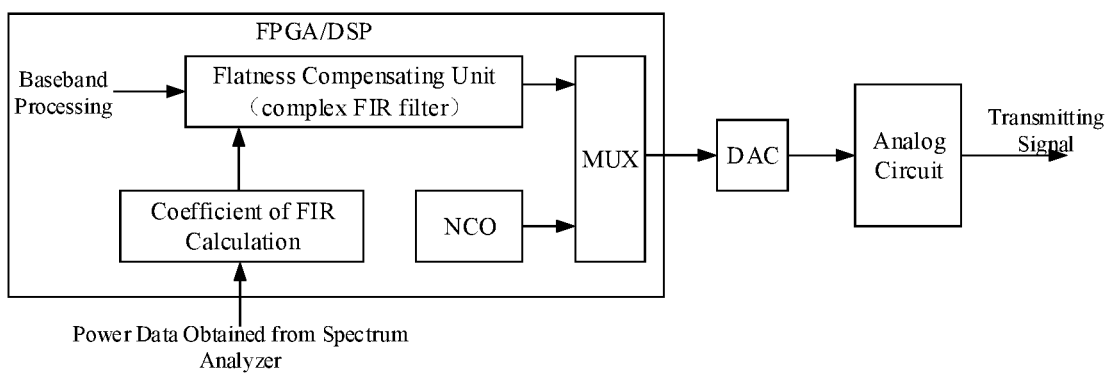
FIG. 4 is a schematic structural diagram illustrating a device for implementing a method for compensating gain flatness of a transmitter according to an embodiment of the present disclosure.

FIG. 4 is a schematic structural diagram illustrating a device for implementing a method for compensating gain flatness of a transmitter according to an embodiment of the present disclosure. As shown in FIG. 4, the transmitter generally includes a DSP or FPGA, a DAC, and an analog circuit unit.

The analog circuit unit of the transmitter generally includes a one-stage or multi-stage band-pass filter, a mixer or modulator, a power amplifier (PA), a duplexer and other circuits. Since this analog circuit unit is not an important part of the present disclosure, it is illustrated by one module block in FIG. 4.

The un-flatness gain of the transmitter is mainly caused by the analog circuit unit. According to the present disclosure, a complex FIR filter is constructed in digital domain so as to compensate the gain flatness.

In the digital domain, a numerically controlled oscillator (NCO) is used to generate single-tone signals at N frequency points, with a frequency range from $-fs/2$ to $fs/2$, and $fs/N$ is used as a stepping. Firstly, in FIG. 4, the output of the NCO is selected by the multiplexer module (MUX) and sent to the DAC, and the power P_n at each frequency point is measured by using the spectrum analyzer. Then, the transmitter enters the normal operating mode, and the output of the FIR filter is selected by the MUX and transmitted to the DAC. Since the IFFT transformation is to be performed on P_n, for convenience of calculation, the value of N is limited to an integer power of 2. The larger the value of N, the more accurate the flatness compensation result is.

The result $P_n$ measured by the spectrum analyzer is input to the digital signal processor for subsequent processing. The gain flatness $P_n'$ of the transmitting channel is calculated based on the power of the center frequency $f_c$ of the channel (that is, the zero frequency in the digital domain). The power point corresponding to the center frequency is $P_{N/2}$, then:

$$P_n' = 10^{(P_n - P_{N/2})/20}, n=0,1,2 \ldots N-1.$$

Since the power measured by the spectrum analyzer is in the unit of dB, it is necessary to be converted as an absolute power value through a power operation.

The remaining processing methods are consistent with the method for compensating the gain flatness of receiver, and will not be repeated herein.

The above description is only the preferred embodiments of the present disclosure. It should be noted that for those skilled in the art, without departing from the principles of the present disclosure, several improvements and modifications can be made, and the improvements and modifications should be regarded as the protection scope of the present disclosure.

What is claimed is:

1. A method for compensating gain flatness of a receiver, by compensating a gain flatness of a receiving channel using a complex-coefficient finite impulse response (FIR) filter in digital domain, the method comprising:
    converting a signal received by an analog-to-digital converter (ADC) into an IQ signal with zero-intermediate frequency;
    setting $f_c - f_s/2$ as a starting frequency point, transmitting single-tone signals at N frequency points with a frequency interval of $f_s/N$, and calculating a power $P_n$ of each frequency point in the digital domain, wherein $f_c$ represents a center frequency of the receiving channel, $f_s$ represents a sampling rate of a digital signal, and N takes a value of an integer power of 2;
    calculating the gain flatness in a whole $f_s$ bandwidth based on a power of the center frequency $f_c$ of the receiving channel to obtain a sequence $P_n'$;
    adding linear phase information to the sequence $P'_n$ to construct a complex sequence $X_n$ of N points;
    performing an inverse fast Fourier transform (IFFT) transformation of N points on the complex sequence $X_n$ to obtain a frequency response $Y_n$;
    approximating the frequency response $Y_n$ using a complex sequence $Z_q$ of Q points, wherein Q is chosen from a suitable integer; and
    constructing a Q-order complex FIR filter with the complex sequence $Z_n$ as a coefficient of the FIR filter in the digital domain, filtering the IQ signal, and obtaining a filtering result as data after compensating the gain flatness.

2. The method of claim 1, wherein a power of an input signal is calculated by the following formula by using an amplitude of the IQ signal in the digital domain:

$$P = 10 * \log_{10}((\Sigma_{m=0}^{M-1} I_m^2 + Q_m^2)/M),$$

wherein M represents the number of points for calculating the power.

3. The method of claim 1, wherein the sequence $P_n'$ is calculated by the following formula:

$$P_n' = 10^{(P_n - P_{N/2})/20}, n=0,1,2 \ldots N-1,$$

wherein $P_{N/2}$ is a power point corresponding to the center frequency $f_c$ of the receiving channel.

4. The method of claim 1, wherein the adding the linear phase information to the sequence $P'_n$ to construct the complex sequence $X_n$ of N points is calculated by the following formula:

$$X_n = P_n' * e^{j\pi(N/2 - n)*(N-1)/N}, n=0,1,2 \ldots N-1.$$

5. The method of claim 1, wherein the performing the IFFT transformation of N points on the complex sequence $X_n$ to obtain the frequency response $Y_n$ comprising:
    performing a shift processing on the complex sequence $X_n$ to obtain a complex sequence $X'_n$, and
    performing the IFFT transformation on the complex sequence $X'_n$ to obtain the frequency response $Y_n$;
    wherein the shift processing is performed by the following formula:

$$X_n' = \begin{cases} X_{n+N/2} & \text{if } n < N/2 \\ X_{n-N/2} & \text{if } n \geq N/2 \end{cases}.$$

6. The method of claim 1, further comprising:
    giving single-tone signals at a plurality of frequency points $(f_1, f_2, \ldots, f_n)$ with different amplitudes $(G_1, G_2, \ldots, G_n)$, wherein the single-tone signals at an edge of a frequency band are given an amplitude of a relative large G value, and the single-tone signals at other part of the frequency band are given an amplitude of a relative small G value;
    using the single-tone signals at the plurality of frequency points as an excitation source of the FIR filter in the digital domain;
    calculating half of the frequency response $Y_n$ to obtain half of the complex sequence $Z_q$; and
    obtaining the complex sequence $Z_q$ for best approximating the frequency response $Y_n$ when a mean square error is the smallest or an self-adaptation process converges.

7. The method of claim 1, wherein the complex-coefficient FIR filter is constructed with four coefficient FIR filters.

8. A method for compensating gain flatness of a transmitter, by compensating a gain flatness of a transmitting channel using a complex-coefficient finite impulse response (FIR) filter in digital domain, the method comprising:
    generating, by a numerically controlled oscillator (NCO), single-tone signals at N frequency points with a frequency interval of $f_s/N$ in a frequency range from $-f_s/2$ to $f_s/2$, and measuring the power $P_n$ at each frequency point, wherein $f_s$ represents a sampling rate of a digital signal, and N takes a value of an integer power of 2;
    calculating the gain flatness of the transmitting channel based on a power of a center frequency $f_c$ of the transmitting channel to obtain a sequence $P_n'$;
    adding linear phase information to the sequence $P'_n$ to construct a complex sequence $X_n$ of N points;
    performing an inverse fast Fourier transform (IFFT) transformation of N points on the complex sequence $X_n$ to obtain a frequency response $Y_n$;
    approximating the frequency response $Y_n$ using a complex sequence $Z_q$ of Q points, wherein Q is chosen from a suitable integer; and
    constructing a Q-order complex FIR filter with the complex sequence $Z_n$ as a coefficient of the FIR filter in the digital domain before the digital signal is transmitted to a digital-to-analog converter (DAC), converting a signal received by the ADC into an IQ signal, filtering the IQ signal, and obtaining a filtering result as transmitting data after compensating the gain flatness.

9. The method of claim 8, wherein a power of an input signal is calculated by the following formula by using an amplitude of the IQ signal in the digital domain:

$$P = 10 * \log_{10}\left(\left(\sum_{m=0}^{M-1} I_m^2 + Q_m^2\right) / M\right)$$

wherein M represents the number of points for calculating the power.

10. The method of claim 8, wherein the sequence $P_n'$ is calculated by the following formula:

$$P_n' = 10^{(P_n - P_{N/2})/20}, n = 0,1,2 \ldots N-1,$$

wherein $P_{N/2}$ is a power point corresponding to the center frequency $f_c$ of the transmitting channel.

11. The method of claim 8, wherein the adding the linear phase information to the sequence $P'_n$ to construct the complex sequence $X_n$ of N points is calculated by the following formula:

$$X_n = P_n' * e^{j\pi(N/2-n)*(N-1)/N}, n=0,1,2 \ldots N-1.$$

12. The method of claim 8, wherein the performing the IFFT transformation of N points on the complex sequence $X_n$ to obtain the frequency response $Y_n$ comprising:

performing a shift processing on the complex sequence $X_n$ to obtain a complex sequence $X'_n$, and performing the IFFT transformation on the complex sequence $X'_n$ to obtain the frequency response $Y_n$;

wherein the shift processing is performed by the following formula:

$$X_n' = \begin{cases} X_{n+N/2} & \text{if } n < N/2 \\ X_{n-N/2} & \text{if } n \geq N/2 \end{cases}.$$

13. The method of claim 8, further comprising:

giving single-tone signals at a plurality of frequency points ($f_1, f_2, \ldots, f_n$) with different amplitudes ($G_1, G_2, \ldots, G_n$), wherein the single-tone signals at an edge of a frequency band are given an amplitude of a relative large G value, and the single-tone signals at other part of the frequency band are given an amplitude of a relative small G value;

using the single-tone signals at the plurality of frequency points as an excitation source of the FIR filter in the digital domain;

calculating half of the frequency response $Y_n$ to obtain half of the complex sequence $Z_q$; and obtaining the complex sequence $Z_q$ for best approximating the frequency response $Y_n$ when a mean square error is the smallest or an self-adaptation process converges.

14. The method of claim 8, wherein the complex-coefficient FIR filter is constructed with four coefficient FIR filters.

* * * * *